Sept. 7, 1954        H. LINDARS        2,688,477
WEIGHING MECHANISM

Filed May 14, 1951        5 Sheets-Sheet 2

Inventor
Herman Lindars
By Peck & Peck

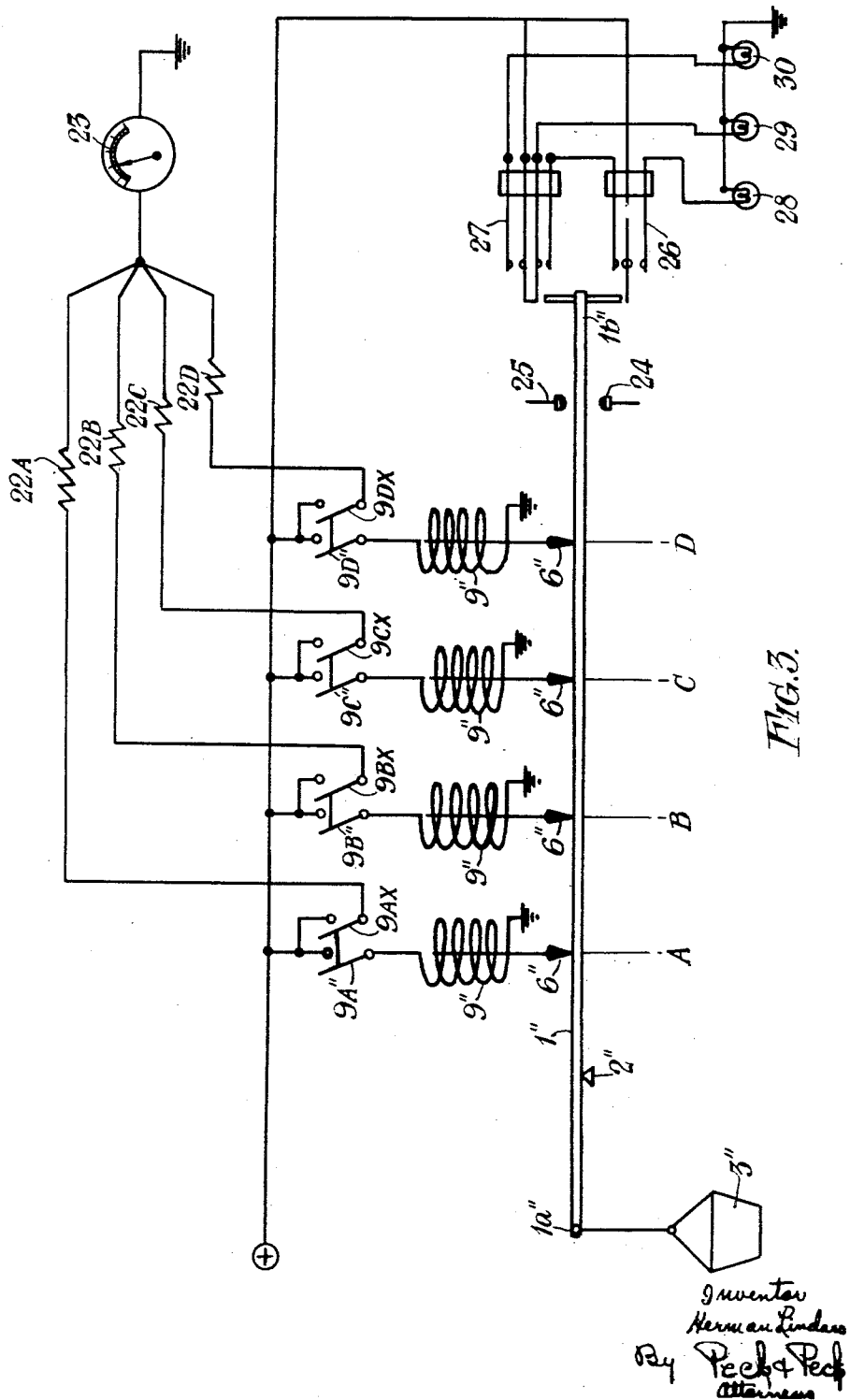

Sept. 7, 1954 H. LINDARS 2,688,477
WEIGHING MECHANISM
Filed May 14, 1951 5 Sheets-Sheet 4
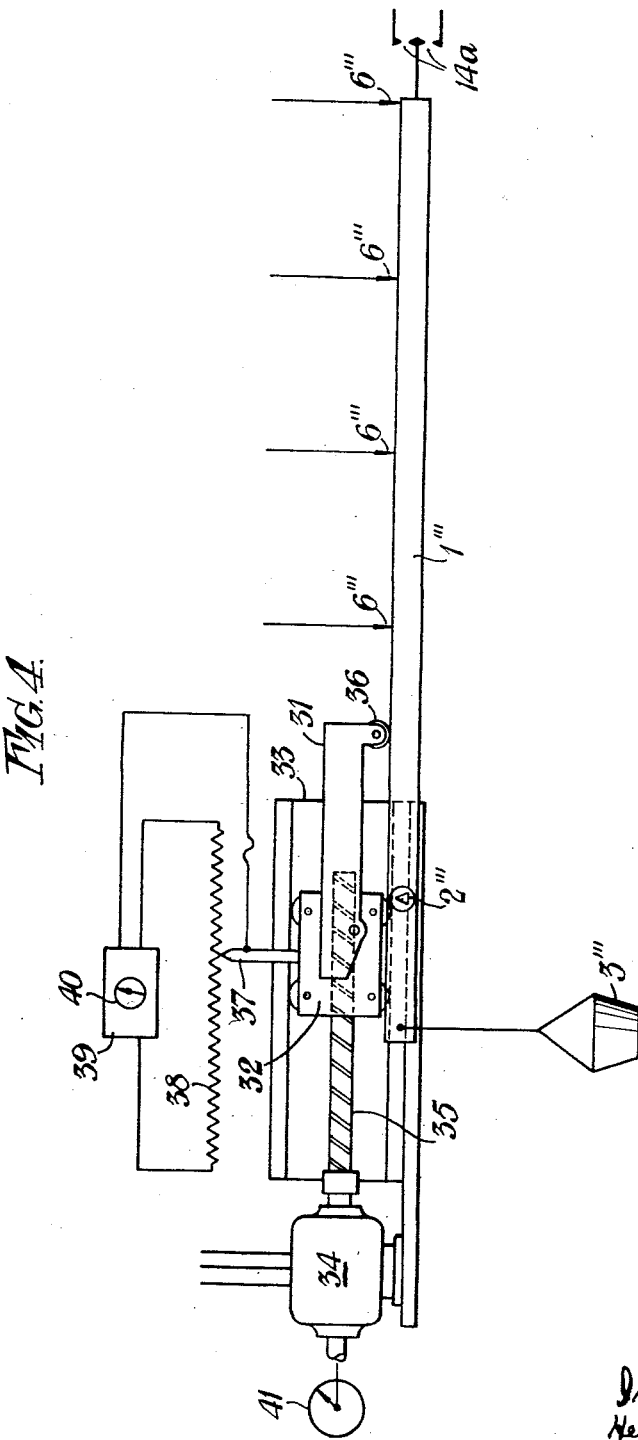

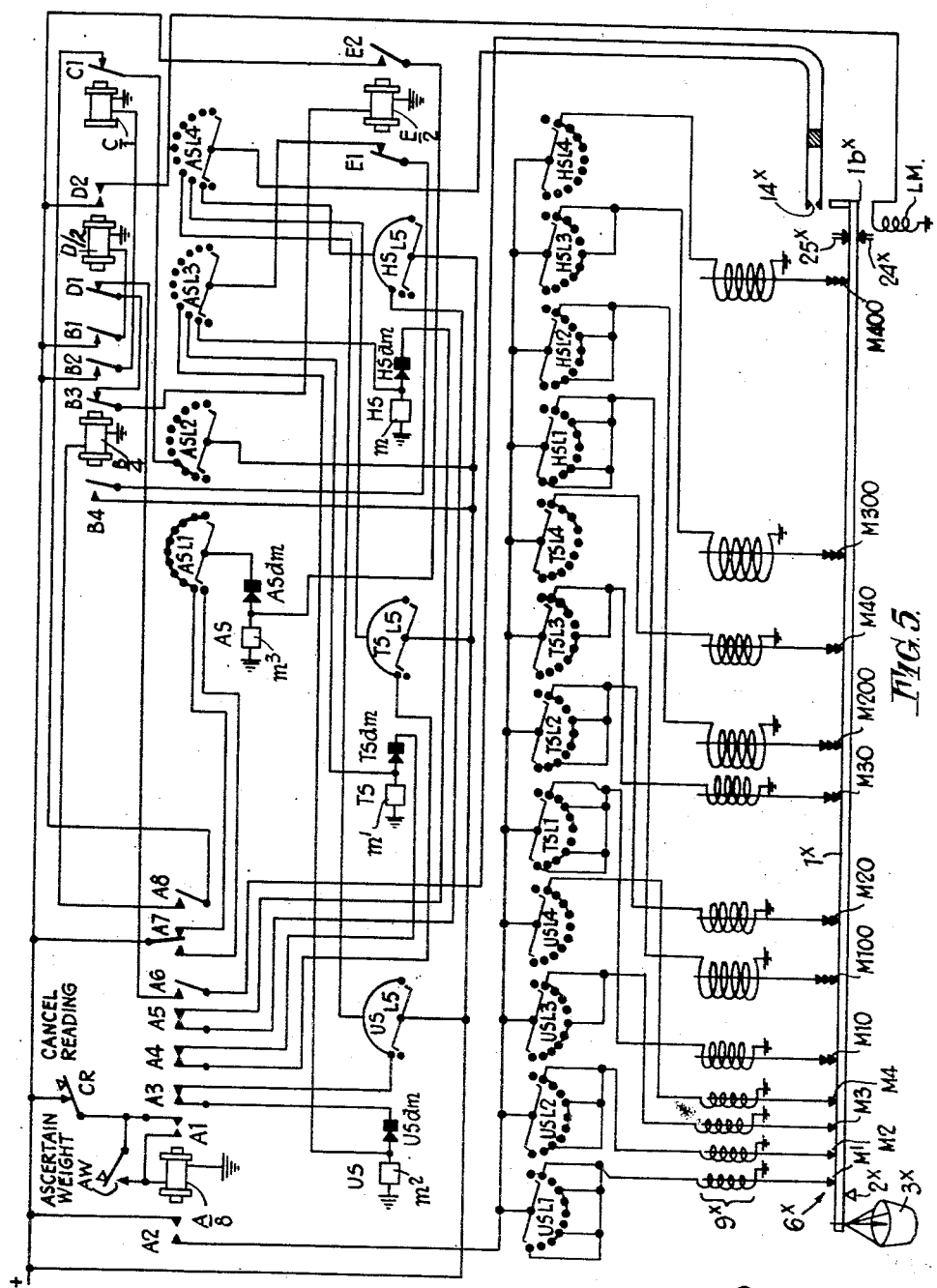

Patented Sept. 7, 1954

2,688,477

UNITED STATES PATENT OFFICE 2,688,477

WEIGHING MECHANISM

Herman Lindars, Sheffield, England

Application May 14, 1951, Serial No. 226,185

Claims priority, application Great Britain
May 15, 1950

2 Claims. (Cl. 265—48)

This invention concerns weighing mechanisms and has for an object to provide a mechanism which will enable weight to be ascertained, indicated or recorded to any desired degree of accuracy, if desired at a remote point, and which can also be remotely set to weigh out a preselected quantity of a material, whether solid, fluid, powdered, granular, or in other comminuted form.

It is another object of the present invention to provide weighing mechanism comprising a weighbeam having a plurality of predetermined points of application of a known balancing load or loads, and means for applying or removing a balancing load to or from a respective point of application to the weighbeam according to the desired balancing moment to be applied thereto.

The balancing loads may be constituted by springs or weights according to preference, although weights would normally be employed to avoid difficulties due to ageing of the springs, and the exact matching of replacement springs when these are needed.

The means for applying or removing a balancing load preferably comprises an electromagnet or solenoid, the armature of which is engageable with the load to lift it clear of the weighbeam or to apply it thereto as required, the circuit of the said electromagnet being energised by a switch which may be either manually or automatically operated.

For the purpose of fine adjustment of the balancing moment applied by one or more balancing loads, a slidable jockey weight may be associated with the weighbeam, and an operating motor (which may be separately mounted or carried on the beam adjacent the fulcrum thereof) may be mechanically connected to the said jockey weight to adjust the position thereof lengthwise of the beam in known manner. The beam is in balance when the jockey weight is in the zero position and no load is applied to the scale pan or the beam.

Advantageously, the deflection of the beam on either side of the balance position is limited by stops which are constituted by electrical contacts which are connected in a control or indicator circuit. Where material is to be automatically weighed, the said contacts may control an automatic switching circuit for energising the electromagnets to apply or remove the balancing loads. Such an automatic switching circuit may include a rotary selector switch of the telephone uniselector type, the contacts on the various levels of which are connected to the appropriate electromagnets, or a series of relays connected in cascade.

The invention may take a variety of forms according to the particular requirements of each desired application. Some possible forms will now be described, by way of illustration only, with reference to the accompanying schematic drawings in which:

Fig. 3 shows a modification whereby an unknown weight is remotely indicated;

Fig. 4 is a diagrammatic view of an arrangement for obtaining a fine sub-division of the smallest unit of increment of balancing moment, and Fig. 5 illustrates one form of automatic control circuit for ascertaining the value of an unknown weight of material in the scale pan.

Figure 1:
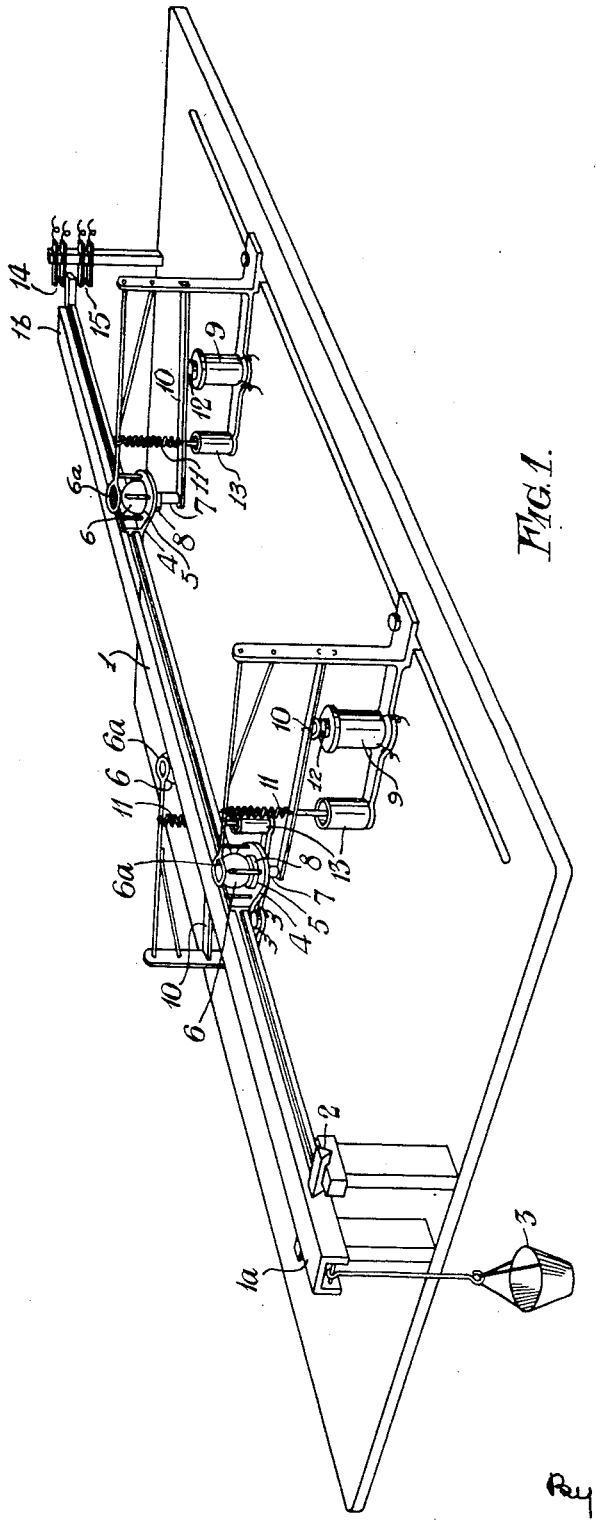
Fig. 1 illustrates a simple construction of weighbeam and balancing weights.

In a first and relatively simple form of the invention and as shown in Fig. 1, the weighbeam is constituted by a simple beam 1 having a length of, say, 52 inches, the fulcrum 2 being located 2 inches from one end 1a. From this end 1a is suspended the scale pan 3 or equivalent receptacle for the material to be weighed out. With no weight in the scale pan, and no balancing weight applied to the other end of the beam, the whole is in balance.

The beam 1 is provided at intervals along its length with laterally projecting lugs 4 which are drilled to form seatings 5 for co-operating spherical weights 6 which constitute the balancing loads. Just below and coaxial with each said seating 5 is located a plunger 7 having a cupped upper end 8 to engage beneath the corresponding spherical weight 6 so as to raise or lower it off or on to the seating 5 under the control of an electromagnet 9. The plunger is carried on the end of a lever 10 which is spring loaded at 11 to the upper or weight-raising position and carries the armature 12 of the electromagnet 9, the pull of which opposes the loading of the spring 11. Energisation of the said magnet 9 thus operates to lower the weight 6 on to the beam 1. A dash-pot 13 is connected to each beam 10 to cushion the shock of applying or lifting a load 6 to or from its seating 5 in the lug 4. Steadies 6a are located so as to receive the several weights 6 in their off positions.

Above and below the free end 1b of the beam 1 are located respective upper and lower limit stops in the form of pairs of electrical contacts 14, 15 respectively. These may be connected in circuit with a balance indicator (not shown) to show at a remote point when the beam 1 is in balance. Clearly, the degree of accuracy of a weighing operation carried out by a mechanism such as has been described is directly dependent on the number, size and distribution of weights 6 available for providing the balancing moment. Thus, for example, if 19 weights of, say, 1 oz. are distributed along the beam as follows: the first 9 at distances of 1 inch, 2 inches, 3 inches ... 9 inches respectively from the fulcrum, the next 10 at distances of 10 inches, 20 inches, 30 inches ... 100 inches respectively from the fulcrum, a balancing moment of from 1 to 595 inch-ozs. is available in steps of one inch-oz.

Figure 2:
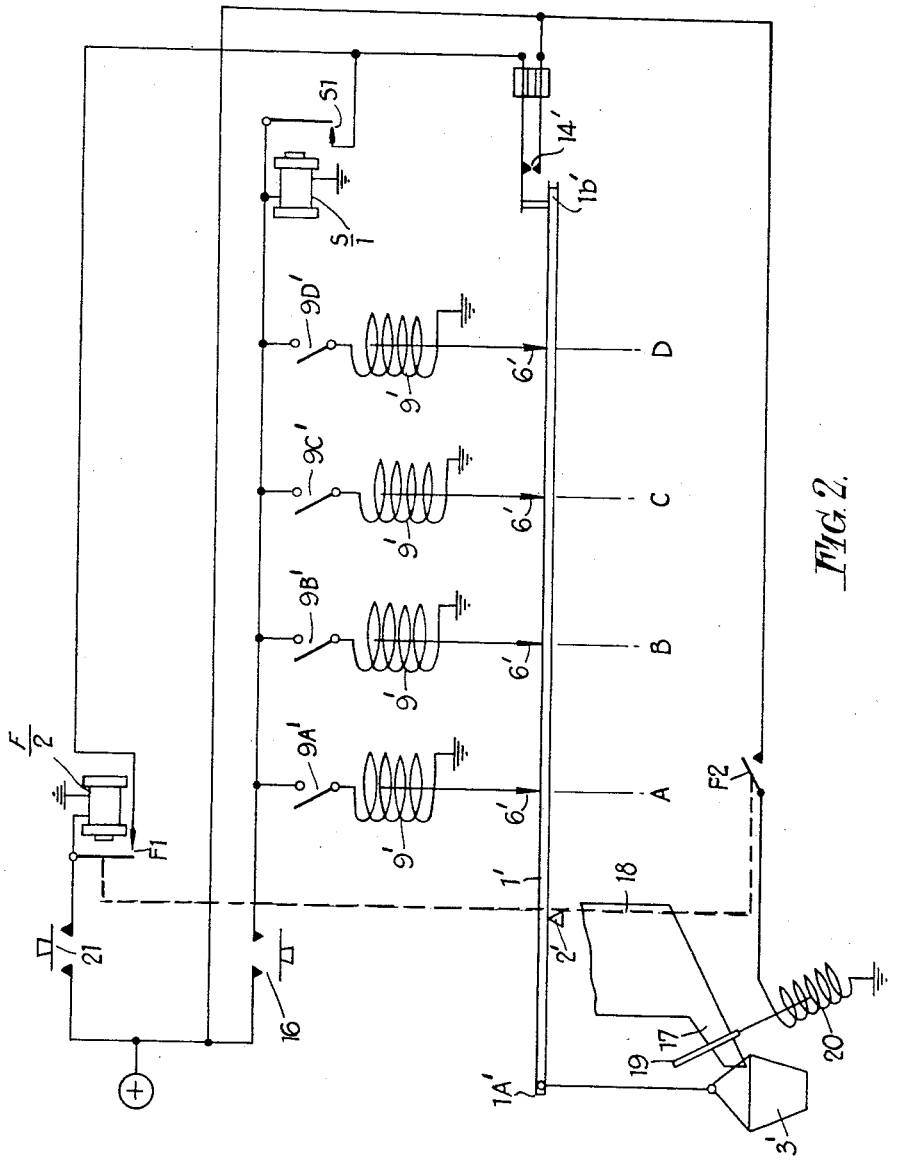
Fig. 2 shows a weighbeam arranged as in Fig. 1 with an associated electrical remote control circuit for applying or removing the balancing weights.

By judicious selection of the values and spacings of a few balance weights 6, a wide range of scale pan weights can be balanced. Thus, if, in the arrangement shown in Fig. 2, there are four weights 6' each of 1 oz., and if these are spaced along the beam 1' at A, B, C and D, at distances of 10 inches, 20 inches, 30 inches and 40 inches respectively from the fulcrum 2', it will be seen that ten different moments are available:

| Weight | Moment in inch-ozs. |
| --- | --- |
| A | 10 |
| B | 20 |
| C | 30 |
| D | 40 |
| D+A (or B+C) | 50 |
| D+B (or C+B+A) | 60 |
| D+C | 70 |
| D+C+A | 80 |
| D+C+B | 90 |
| D+C+B+A | 100 |

Each electromagnet 9' is connected to the positive main through a respective switch 9A', 9B', 9C', 9D' to a common "set" button 16 whose contacts are normally open. The electromagnets 9', when energised, are operative to apply the appropriate balance weight 6' to the beam 1'. The scale pan 3' is located immediately beneath the outlet 17 of a hopper 18 for material to be weighed, the said outlet 17 being controlled by a slide or shutter 19 which is normally biased—as by a spring (not shown)—to the closed position. The shutter 19 is controlled by an electromagnet 20. The circuit to this latter electromagnet is controlled by a pair of normally open relay contacts F2 which are operated by a relay F/2 having its one side earthed and its other side connected to the positive main through a "feed" button 21, the contacts of which are normally open. The other pair of contacts F1 of the relay F/2 are connected in series with the upper stop contacts 14' which are arranged to be opened when the weight in the scale pan exceeds the applied balancing weight and causes the free end 1b' of the beam 1' to rise. The other side of the pair of contacts 14' is connected to the relay contacts F2.

In parallel with the electromagnets 9' and their respective switches 9A' ... 9D' is connected a second relay S/1 whose contacts S1 are connected in circuit between the live side of the winding of the relay S/1 and the normally open contacts F1 of the relay F/2.

In use, the operator closes the appropriate switches 9A' ... 9D' according to the required weight of material to be delivered from the hopper 18, and then presses the "set" button 16. This energises the selected electromagnets 9' and the desired balance weights 6' are applied to the beam 1'.

The end 1b' of the beam 1' thus falls and the stop contacts 14' are allowed to close. Simultaneously, the relay S/1 is energised and closes its contacts S1 which complete the hold-on circuit through the closed contacts 14 to both the relay S/1 and the selected electromagnets 9'.

After a brief interval—sufficient to enable the dashpot associated with each balance weight 6' to complete its function—the "feed" button 21 is pressed momentarily, energising the relay F/2 which closes its contacts F1 and F2. Contacts F1 complete the hold-on circuit for relay F/2 through the contacts 14' (which are still closed). Contacts F2 connect the positive main to the shutter magnet 20, which is then energised to open the shutter 19 and allow material to discharge from the hopper 18 into the scale pan 3'.

When the desired weight has been discharged, the end 1b' of the beam 1' rises against the stop contacts 14' and opens them, thus breaking the hold-on circuits to the two relays S/1, F/2 and the electromagnets 9'. On the de-energisation of the relay F/2, the contacts F2 open and the shutter 19 is closed under the action of its spring and no further material is discharged from the hopper 18 into the scale pan 3'.

The apparatus is thus restored to its original state and, after the scale pan 3' has been discharged, will be in readiness for a further weighing operation.

As previously indicated, a fairly wide range of different scale pan weights can be balanced by a few balancing weights 6 of judiciously selected values located at appropriate points along the beam 1. The following table shows how, by employing only sixteen balance weights 6 each controlled by a separate switch, such as 9A' in Fig. 2, any scale pan weight from 1 lb. to 6 tons, 19 cwts., 3 qrs., 27 lbs. can be weighed in increments of 1 lb.:

| Units of Weight | No. of balance weights 6 | Individual moments | Total |
| --- | --- | --- | --- |
| lb | 6 | 1, 2, 3, 4, 7, 10 | 27 lbs. |
| qrs | 2 | 1, 2 | 3 qrs. |
| cwts | 5 | 1, 2, 3, 4, 9 | 19 cwts. |
| tons | 3 | 1, 2, 3 | 6 tons. |

It will, of course, be evident that, by a similarly appropriate selection of the values and points of application (i. e. moments) of the balance weights 6, other ranges may be covered in, say, metric units or, for a given material to be weighed, volumetric units such as pints, bushels or the like.

Springs may be used in place of weights for providing the necessary balancing moments, as will be understood.

Where the material to be weighed is contained in or discharged into a removable container— for example, a truck, bogey, barrow or other transporting device—the tare weight of the container may first be balanced, say, by using a separate set of weights 6 or a jockey weight provided for the purpose, and then the material may be weighed to the desired value within the range of the combination of balance weights provided. In any such system, it will be appreciated that remote indication of the weight of material may be desirable, and the indicating apparatus may be so arranged that the weight of any container used is ignored.

Indication or recording of the weight of an unknown quantity of material in the scale pan may be effected in any known manner. One relatively simple method of electrical remote indication comprises causing the application of each balancing load to the weighbeam to connect a known resistance into the measuring circuit. Such an arrangement is illustrated in Fig. 3 of the accompanying drawings. For the sake of clarity of representation, only the remote indicating circuit is shown in this figure although it will be understood that it may be combined with a remote control circuit such as that shown in Fig. 2.

Each manual weight selector switch 9A″ ... 9D″ of the electromagnets 9″ in Fig. 3 has ganged therewith a second switch 9AX ... 9DX respectively. Each of the latter switches is connected to a respective resistance 22A, 22B, 22C, 22D which is connected in series with an ammeter 23, so that, on closure of any one of the switches 9AX ... 9DX simultaneously with the corresponding weight selector switch 9A″ ... 9D″, a resistance having a value corresponding to the moment of the selected weight is connected in circuit with the ammeter 23. The latter may thus be calibrated directly in terms of weight in the scale pan 3″.

Separate fixed stops 24, 25 are provided for the free end 1b″ of the beam 1″, which is fulcrummed at 2″, whilst "high" and "low" contact stacks 26, 27 respectively are arranged to be operated by the beam as it approaches the corresponding fixed stop 24, 25. These contact stacks control "high," "balance" and "low" indicator lamps 28, 29, 30 respectively. The circuit arrangement is as follows: The positive main is connected directly to a contact spring 26a in the stack 26, this spring being engageable by a stud X on the underside of the beam 1 at its free end 1b. In the balance position shown, the said X is out of contact with the spring 26a, and the latter engages a fixed contact 26b. The contact 26b is connected to a fixed contact 27a in the stack 27 which is normally engaged by a contact spring 27b connected to the balance indicator lamp 29. The spring 27b is engageable by a stud Y on the upper side of the beam 1 opposite the stud X, and carries an insulating block 27x bearing against a second contact spring 27c. In the balance position of the beam 1, the stud Y is out of engagement with the spring 27b so that, in this position of the beam, the circuit from the positive main to the balance indicator lamp 29 is completed through the spring 26a, contact 26b, contact 27a, and spring 27b.

When a load is placed in the scale pan 3, the beam 1 tilts to raise its free end 1b against the upper stop 25. At the same time, the stud Y lifts the spring 27b out of contact with the fixed contact 27a, thus breaking the circuit to the balance lamp 29. Simultaneously, the contact spring 27c is lifted, through the insulating block 27x, to engage a fixed contact 27d in circuit with the "high" indicator lamp 30. The spring 27c is connected to the positive main, so that this lamp is now illuminated. If now an excess balancing moment is applied to the beam 1 by the weight 6, the beam is depressed until its free end 1b engages the lower stop 24. This deflection causes the upper stud Y to disengage the spring contacts 27b, 27c, thus opening the circuit to the "high" indicator lamp 30, and thereafter the lower stud X engages and depresses the spring contact 26a until it engages the fixed contact 26c. This contact is connected to the "low" indicator lamp 28, and the circuit from the positive main to this lamp is thus completed.

It will be appreciated that each time the free end 1b of the beam 1 swings from the upper stop 25 to the lower stop 24, and vice versa, the circuit of the balance lamp 29 will be completed momentarily. The lamps 28, 29, 30 together with the switches 9A″, 9AX ... 9D″, 9DX and the ammeter 23 may be located at a remote point so that weighings may be effected from a distance with the same degree of accuracy as can be achieved at the location of the beam 1″.

It is only necessary to choose appropriate values for the resistances 22A ... 22D for a group of four weights to ensure that the operation of the four weights singly or in combination will produce one of eleven definite readings, including "0." By arranging for the resultant resistances of all groups (say, the hundreds, tens and units groups) to be switched into circuit with a voltmeter or ammeter, or with a recording voltmeter or ammeter, it is possible to indicate or record the balancing loads which are operative at any time on the weighbeam 1″, and therefore the total weight which is pre-set or ascertained.

Although, as has already been stated, it will in general be preferred to employ balance weights rather than springs to provide the necessary balance moment, the same results are obtainable with such springs, as will be readily understood. Furthermore, a spring pressure may be applied to the beam progressively, thus avoiding shock to the system which may otherwise cause undesirable oscillations of the beam if applied at or near the balance point in a weighing. This feature of progressive application of the balance load may also be usefully adapted for the weighing of quantities to an accuracy greater than the unit of increment in the balance moment provided by fixed loads applied at fixed positions. Thus, for example, one balance spring may, for this purpose, be provided with an adjustable abutment which can be moved progressively in either direction by a servo mechanism of suitable design, the position of which can be calibrated in terms of weight in the scale pan. Such a balance spring would be applied to the beam only when the other springs had been applied in that combination which produces a balance moment less than that of the weight in the scale pan by an amount less than one unit of increment of the balance moment.

A fine subdivision of one unit of increment in the balance moment may alternatively be provided, as shown diagrammatically in Fig. 4, by means of a jockey weight in the form of a subsidiary lever 31 which is pivoted on a carriage 32 movable along a fixed guideway 33 over a distance of say 10 inches from the fulcrum 2‴ (considering the last-mentioned construction of weighbeam described above) by a reversing electric motor 34 and screw-threaded shaft 35. One end of the subsidiary lever 31 bears through a roller 36 on the weighbeam 1‴. This lever is so loaded as to exert a force of, say, one ounce at its point of bearing on the beam. The balance weights or the like along the beam are indicated at 6‴.

The carriage 32 carries a wiper 37 engaging an electrical resistance 38. By means of an electrical bridge circuit (indicated diagrammatically at 39) which includes this resistance, this carriage, and with it the subsidiary lever 31 can be manually or automatically controlled so that it will either take up a definite position, thereby applying a moment to the lever of, say, from 0 to 10 inch-ozs. steplessly, or automatically find, by means of an appropriate electrical circuit (which may include upper and lower limit contacts P, Q and a co-operating contact R operated by the beam 1), a position which will just balance a moment exerted by a weight in the scale pan 3'''.

A simple form of automatic circuit for the motor 34 is illustrated in Fig. 4. Here, the motor 34 is a D. C. reversible motor having the one ends of its forward and reverse windings connected to the D. C. positive main while the other ends $p$, $g$ of the windings are connected respectively to upper and lower limit contacts P, Q. The co-operating contact R carried by the beam 1 is earthed. The motor 34 thus runs in the appropriate direction so long as the circuit of the corresponding winding is completed by the beam-operated contacts P, Q, R. At balance, neither winding of the motor 34 has its circuit completed, and the motor is stationary. The circuit between the motor 34 and the limit contacts P, Q, is broken away and indicated, in the conventional way, by the arrowheads $p$. $g$. The circuit 39 may include a remote weight indicating meter 40, or a suitable dial and pointer mechanism 41 may be mechanically coupled to the shaft of the motor 34.

Alternatively, again, in order to achieve fine subdivision of a unit increment of balancing moment, a spiral spring may be anchored to the beam on its fulcrum axis, the other end of the spring being anchored in an adjustable abutment which can be moved by a servo-motor so as to provide the final fraction of an increment in the balance moment in a weighing operation.

In order that the balance moment should be applied to or removed from the weighbeam with a minimum of disturbance to the latter, especially near the balancing point, a dashpot mechanism may profitably be incorporated, either in the weight or spring operating mechanism, or directly connected to the weighbeam itself. Alternatively, or in addition to this dashpot mechanism, an electromagnet may advantageously be used for the purpose of holding the weighbeam steady through the balance, actual movement of the weights on to and away from their seatings on the weighbeam.

Weighing mechanism according to the present invention is of particularly advantageous application to remote controlled batch weighing apparatus in which predetermined quantities of one or more materials are required to be weighed out and discharged according to a pre-set programme. Examples of such apparatus are described in the specifications of co-pending patent applications Nos. 183,481 filed September 7, 1950, and 217,769 filed March 27, 1951. One arrangement of weighbeam which would provide a suitable range of weights is constituted as follows:

The beam is of a nominal length of 52 inches, with the fulcrum 2 inches from the end which carries the scale pan or equivalent receptacle for material to be weighed (hereinafter termed for convenience the scale pan). Four balance weights of ¼ oz. are spaced along the beam at distances of 2, 4, 6 and 8 inches from the fulcrum, four ½ oz. weights at distances 10, 20, 30 and 40 inches from the fulcrum, and four 4-oz. weights at distances of 12½, 25, 37½ and 50 inches from the fulcrum. By applying the balance weights to the beam in various combinations (which may be effected manually or automatically from a remote point), it is possible to exert any moment on the beam of from ½ inch-oz. to 555 inch ozs. in increments of ½ inch-oz. (500+50+5 inch-oz.); that is to say, in increments of one part in 1110. In the example quoted, twelve control switches only are required to cover the whole range of weights. It will be understood by those versed in the art that, by means of compounding with additional levers, such a weighbeam of 52 inches nominal length would suffice to balance out considerable loads in the scale pan.

Figure 5 illustrates an apparatus according to the present invention for the automatic determination of unknown weights of material. The desired determination is based on the use of devices known in the art as uniselectors. These devices comprise a series of levels each embodying a set of contacts over which a wiper is movable and they have a stepwise operation effected by driving magnets. In such a device, the driving magnets are energised through normally closed contacts to move pawls over ratchet wheels on the driving spindles of respective wipers. This movement of the pawls also opens the driving magnet contacts to de-energise the magnets, the pawls then being returned by springs to step the ratchet wheels and wiper driving spindles round through one contact pitch on the levels of the uniselector. The action is analogous to that of a single cycle of the trembler of an electric bell and is the standard operation in the uniselector art.

In Figure 5, the weighbeam $1^\times$, fulcrumed at $2^\times$, has a plurality of balancing weights (or springs), generally indicated at $6^\times$, distributed therealong at intervals such that their moments fall into three groups—units, tens and hundreds respectively—each individual weight being identified in the drawing by the letter M with a numeral indicating the corresponding relative moment, e. g. M1, M20, M400. There are four weights in each group arranged so that increments of moment from 1 to 10, 10 to 100, or 100 to 1000 respectively, can be obtained in steps of the appropriate single units.

Each weight (or spring) $6^\times$ is controlled by an electromagnet or solenoid $9^\times$ which, when energised, applies the respective weight to the beam $1^\times$. The free end $1b^\times$ of the beam is arranged to close a pair of electrical contacts $14^\times$ when the moment of the applied weights $6^\times$ is insufficient to balance the moment due to the weight in the scale pan $3^\times$, and upper and lower stops $25^\times$, $24^\times$ respectively are provided for limiting the deflection of the beam in the usual way.

Each electromagnet or solenoid $9^\times$ has the one end of its winding earthed and the other end connected to the appropriate contacts on a respective level L1 . . . L4 of one of three uniselectors US, TS or HS, representing the units, tens, or hundreds group respectively. The said connections on each level are arranged so that, when the wipers are moved from their zero contacts to the first contacts, all the weights (or springs) $6^\times$ of the associated group are applied to the beam $1^\times$, whilst in the succeeding positions of the wipers the total moment is reduced progressively in unit steps to zero. All the contacts, except the zero contact, on a fifth level L5 of each uniselector HS, TS, US are strapped together and connected, in that order, to the first second or third contact on the fourth level L4 of a fourth uniselector AS. They are also connected, through normally closed relay contacts A3, A4, A5 respectively, to their respective "housing" contacts US$dm$, TS$dm$, and HS$dm$ which automatically impulse the uniselector driving magnets in the usual way so long as current flows through the circuits. The wipers of the levels L5 of the uniselectors US, TS, HS are connected to the positive mains, and the wiper of level ASL4 is connected to one of the contacts 14$^\times$.

The first, second and third contacts of the third level L3 of the uniselector AS are directly connected to the driving magnets $m$, $m^1$ and $m^2$ of the uniselectors HS, TS, US respectively, and the wiper of level ASL3 is connected, through relay contacts E1 and B4 to the positive main. Contacts 1, 2 and 3 of level ASL2 are strapped together and connected through contacts C1 and A8 to relay B/4. The wiper of this level is connected to the positive main. Contacts 1-10 of level ASL1 are strapped together and connected through one side of changeover relay contacts A7 to the positive main, the zero contact being connected through the other side of changeover relay contacts A7 to the positive main. The wiper of level ASL1 is connected to the housing or self-drive contacts AS$dm$ of the uniselector AS.

Two keys—CR and AW—are connected in series between the positive main and a relay A/8. The key CR ("Cancel Reading") is normally closed whilst the key AW ("Ascertain Weight") is normally open. On the depression of the key AW, the relay A/8 is energised and closes the contacts A1, A2, A6 and A8, opens the normally closed contacts A3, A4 and A5 and changes over the contacts 47.

The closing of contacts A1 completes the hold-on circuit for the relay A/8, through the key CR, so that the relay remains energised when the key AW is released. The closing of contacts A2 connects the positive main to the wipers on the levels L1 ... L4 of the three uniselectors US, TS and HS, so preparing the circuit for operation of the electromagnets 9$^\times$. At the same time, the opening of contacts A3, A4, and A5, breaks the homing circuits for the uniselectors US, TS and HS.

The closing of contacts A6 prepares the circuit of the relay E/2, the contacts 14 controlled by the weighbeam 1 being already closed due to tilting of the beam by the unbalanced load placed in the scale-pan 3, and the closing of contacts A8 prepares the circuit of the relay B/4.

When the contacts A7 change over, the positive main is connected through the "0" contact and the wiper of level ASL1 and its self-drive contacts AS$dm$ to the uniselector driving magnet AS, the driving magnet M$^3$ of the other side of which is connected to earth. The uniselector AS thereupon moves one step and then stops, since the rest of the contacts on the level ASL1 are disconnected at the change-over contacts A7.

When the wiper of level ASL2 moves on to contact No. 1, the positive main is connected through the wiper and this contact, normally closed contacts C1, and contacts A8 (which are now closed) to the relay B/4. The latter then operates, closing its contacts B1, B2 and B4 and opening its contacts B3.

The closing of the contacts B1 energises the slugged relay D/2, and the closing of the contacts B2 energises the slugged relay C/1, which immediately de-energises the relay B/4 by opening its contacts C1. The relays E/2, D/2 and C/1 are all slugged relays (referred to hereinafter as "single-slugged," "double-slugged" and "treble-slugged" respectively), the duration of their release delay periods being so arranged that C/1 remains operative for the longest time after its circuit has been broken, D/2 for not quite so long and E/2 for the shortest period of time. Consequently, on the de-energisation of the relay B/4, the double- and treble-slugged relays D/2 and C/1 remain operative for some considerable time.

The opening of contacts B3 breaks the circuit to the single-slugged relay E/2 and prevents this relay from operating at this point; and since the double-slugged relay D/2 remains energised after the relay B/4 is de-energised, the contacts D1 serve to maintain this disconnection.

The operation of contacts D2 energises an electromagnet LM which serves to lock the beam 1$^\times$ in the balanced position for the duration of the delay period of the double-slugged relay D/2, and so prevents any undesired oscillation and vibration of the beam whilst the balance weights are being changed.

The closing and quick re-opening of contacts B4 connects the positive main through the normally closed contacts E1 and the wiper and contact No. 1 of uniselector level ASL3, to the "hundreds" driving magnet $m$ of uniselector HS for a short duration, thus impulsing this uniselector round one step. Thereupon, all the magnets 9$^\times$ of the "hundreds" group are energised through the closed relay contacts A2 and the No. 1 contacts on the levels HSL1 ... HSL4. The hundreds weights M100 ... M400 are thus applied to the beam 1$^\times$ which, at this stage, is locked in the balance position.

After a short period of time, sufficient for stability to be attained, the double-slugged relay D/2 releases and the beam locking magnet LM is de-energised, thus allowing the beam to take up its own true position, whilst at the same time the re-closing of contacts D1 completes the preparation of the circuit of the single-slugged relay E/2.

In the event of the combined effect of the weights M100 ... M400 being greater than the load in the scale pan 3, the beam 1$^\times$ will tilt so that the end 1b$^\times$ will come up against stop 24$^\times$ and the contacts 14$^\times$ will remain open so that the relay E/2 is not energised. The apparatus will remain in this condition until the end of the delay period of the treble-slugged relay C/1, when this relay will release and reclose the circuit to the relay B/4. A further pulse will then re-energise both the double-slugged relay D/2 and the treble-slugged relay C/1 and move the uniselector HS on a further step. Contact No. 2 on the level HSL1 is open-circuit, so that on this step the lowest "hundreds" weight M100 is removed, thus reducing the balancing moment on the beam 1 by 100 units.

A similar sequence of events is repeated, and in the event of the contacts 14$^\times$ remaining open, the whole cycle will be repeated, each time reducing the balancing moment in steps of 100 until it becomes less than the moment due to the load in the scale pan 3$^\times$.

As soon as free end 1b$^\times$ of the beam 1$^\times$ rises to the stop 25$^\times$ due to over-reduction of the balancing moment, the beam-controlled contacts 14$^\times$ are closed and the positive main is connected to the single-slugged relay E/2 through the wiper and bank of level HSL5, contact No. 1 and wiper of level ASL4, closed contacts A6, and normally closed contacts D1 and B3. Thus the slugged relay E/2 is energised.

It will be remembered that at this stage the relay B/4 is de-energised and the double-slugged relay D/2 has just released, but the treble-slugged relay C/1 is still operative due to its heavier slugging.

The closing of contacts E2 energises the driving magnet $m^3$ of uniselector AS, and the opening of contacts E1 breaks the circuit to the driving magnet $m$ of uniselector HS through the wiper on level ASL3. Release of the treble-slugged relay C/1 occurs before release of the single-slugged relay E/2 by a period not less than that required for the relay B/4 to close its contacts and then release them on de-operation of the action of the treble-slugged relay C/1 through its normally closed contacts C1, this latter relay being re-energised for the purpose by the relay B/4 through its normally open contacts B2. This delay period of the single-slugged relay E/2 ensures that the impulse which would otherwise be fed through the contacts B4 and the uniselector level ASL3 to the "hundreds" uniselector magnet is suppressed, so that the setting of the "hundreds" weights on the beam 1 is not changed when the uniselector AS changes the circuit connections to the "tens" uniselector TS. Similarly, of course, the "tens" balance weight setting is not changed when the uniselector AS changes the circuit connections from the "tens" to the "units" uniselector VS.

On the release of the treble-slugged relay C/1, relay B/4 is energised, opening its contacts B3 and de-energising the single-slugged relay E/2. This relay, however, does not immediately release, and consequently the circuit to the driving magnet $m$ of the "hundreds" uniselector HS is not re-made instantaneously. By the time that the single-slugged relay E/2 does release, the relay B/4 will have been de-energized by the action of contacts C1, relay E/2 remaining de-energised by the opening of contacts D1, and consequently the contacts B4 will have re-opened so that this pulse from the relay B/4 does not operate the "hundreds" uniselector HS.

On the release of the single-slugged relay E/2, its contacts E2 are opened and the driving magnet $m^3$ of the uniselector AS is de-energised so that the uniselector AS moves its wipers on one step to their contacts No. 2.

The same chain of events is repeated for the "tens" uniselector TSL2 which is stepped through the contact No. 2 on level ASL3. The first step of the "tens" uniselector TS causes all the "tens" group weight M10 ... M40 to be applied to the beam $1^\times$. When the double-slugged relay D/2 releases again, the locking magnet LM is de-energised and the beam $1^\times$ is freed. If the increased balancing moment is greater than that of the load in the scale pan $3^\times$, the contacts $14^\times$ remain open. The cycle will be repeated, the balancing moment being reduced this time in steps of 10 until the beam-controlled contacts $14^\times$ are again closed. The relay B/4 will then advance the uniselector AS a further step and the chain of events will again be repeated for the "units" uniselector US. This will apply in its first step all the units group weights M1 ... M4, and these will be reduced in steps of one until the balancing moment becomes less than the moment due to the load in the scale pan $3^\times$ by an amount which is a maximum of one unit. The beam-controlled contacts $14^\times$ will again close, energising the single-slugged relay E/2 which in turn advances the uniselector AS a further step on to contact No. 4.

At this stage the circuit to relay B/4 is broken on level ASL2 and hence no further stepping of the "hundreds," "tens" and "units" uniselectors HS, TS, US respectively, can take place. Moreover, the circuit of the relay E/2 is broken on level ASL4 and hence the uniselector AS remains stationary and the apparatus is thus locked in this position.

The position of the wipers on uniselectors HS, TS and US indicates the sum total of the moments that have had to be applied to the beam to balance the load in the scale pan $3^\times$. Thus, if the "hundreds" HS uniselector is at step No. 4, the moment applied to the beam $1^\times$ by the "hundreds" group of weights $6^\times$ will be 700 units. If the "tens" uniselector TS is at step No. 6, the moment applied to the beam by the "tens" group of weights $6^\times$ will be 50 units, and if the "units" uniselector US is at step No. 2, the moment applied to the beam $1^\times$ by the "units" group of weights will be 9 units. Therefore, the total moment applied to the beam will be 759 units and this could be conveniently indicated on dials by pointers driven from the driving spindles of the uniselectors.

On pressing the key CR, the relay A/8 is de-energised, opening its contacts A1, A2, A6 and A8, closing contacts A3, A4 and A5 and changing over the contacts A7.

The opening of contacts A1 breaks the hold-on circuit for relay A/8; the opening of contacts A2 de-energises the electromagnets $9^\times$, removing the weights $6^\times$ from the beam $1^\times$; the closing of contacts A3, A4 and A5 "homes" the uniselectors US, TS and HS through their respective levels USL5, TSL5 and HSL5, whilst the changing over of contacts A7 "homes" the uniselector AS. The opening of contacts A6 breaks the circuit to the relay E/2, and the opening of contacts A8 breaks the circuit to the relay B/4.

The apparatus is thus in its original state and ready to be used again for ascertaining a further weight.

By way of exemplifying the sequence of operation of the various switches and relays in Fig. 5, particulars will now be given listing the same, an illustrative weight being chosen, in this case 654 lbs. The sequence is as follows:

AW ("ascertain weight" switch) closed to operate relay A/8.

A1 provides a holding circuit for relay A/8 across AW.

A2 connects the positive main to the wipers on the levels L1 ... L4 of the hundreds, tens and units uniselectors.

A3 disconnects the homing arc of the units uniselector level L5.

A4 disconnects the homing arc of the tens uniselector level L5.

A5 disconnects the homing arc of the hundreds uniselector level L5.

A6 prepares the operating circuit for relay E/2.

A7 changes over, disconnecting the homing circuit for AS uniselector and connecting the positive main to the first contact on ASL1, causing AS uniselector to make one step on to the first contact of the banks.

A8 closes so that ASL2, through the second contact of its bank, connects up the positive main via C1 and A8 to energise relay B/4.

B1 energises relay D/2.

B2 energises relay C/1.

B3 breaks the operating circuit for relay E/2.

B4 connects the positive main to the wiper of ASL3 via E1 normal and current is now transmitted to energise the drive magnet $m$ of the hundreds uniselector HS.

D1 breaks the operating circuit for relay E/2.
D2 energises the beam locking magnet coil LM.
C1 breaks the operating circuit of relay B/4 which therefore releases.
B1 releasing de-energises relay D/2 which remains operated owing to its double slug.
B2 de-energises relay C/1 which remains operated owing to its treble slug.
B3 prepares for the operation of relay E/2.
B4 disconnects the positive main from the wiper of ASL3 releasing the drive magnet $m$ of uniselector HS, thus allowing the latter to step forward one contact.

When uniselector HS steps on to the first contact the positive main is applied by A2 and HSL1 to energise the hundred pounds weight and apply it to the beam $1^\times$. Similarly the 200, 300 and 400 lbs. weights are also applied to the beam.

D/2' relay releases after its delay time.
D1 prepares the operating circuit for relay E/2.
D2 opens and de-energises the magnet LM allowing the beam to take up its true position.

The beam will now go down to its bottom stop $24^\times$ as the weight set on it is equivalent to 1000 lbs. and the weight in the weigh hopper $3^\times$ is assumed to be 654 lbs., thus the contacts $14^\times$ remain open.

After its delay time relay C/1 releases completing the reoperating circuit for relay B/4.
B/4 operates via C1 in normal position.
Sequence as above to stepping of uniselector HS which now steps on to second contact.
HSL1 opens circuit and releases the 100 lbs weight magnet $9^\times$.
HSL2 holds the 200 lbs. weight magnet.
HSL3 holds the 300 lbs. weight magnet.
HSL4 holds the 400 lbs. weight magnet.
D/2 relay releases.
C/1 relay releases.
B/4 relay operates via C1 in normal position.
Sequence as above. Uniselector HS now steps to third contact.
HSL1 re-energises 100 lbs. weight magnet.
HSL2 opens circuit and releases 200 lbs. weight magnet $9^\times$.
HSL3 holds 300 lbs. weight magnet.
HSL4 holds 400 lbs. weight magnet.
D/2 relay releases.
C/1 relay releases.
B/4 relay re-operates via C1 in normal position.
Sequence as above. Uniselector HS steps on to fourth contact.
HSL1 holds 100 lbs. weight.
HSL2 re-energises 200 lbs. weight.
HSL3 opens circuit and releases 300 lbs. weight.
HSL4 holds 400 lbs. weight.
D/2 relay releases.
C/1 relay releases.
B/4 relay re-operates via C1 in normal position.
Sequence as above. Uniselector HS steps on to fifth contact.
HSL1 holds 100 lbs. weight.
HSL2 holds 200 lbs. weight.
HSL3 re-energises 300 lbs. weight.
HSL4 releases 400 lbs. weight.
D/2 relay releases.

D1 prepares the operating circuit for relay E/2.
D2 de-energises the beam locking magnet LM and the beam $1^\times$ now rises to the top stop $25^\times$ as the weight in the hopper $3^\times$ (654 lbs.) exceeds the weight applied to the beam (600 lbs.).
Contacts $14^\times$ close.
E/2 relay operates.
E1 breaks the operating circuit of the drive magnet $m$ of the uniselector HS via B4 and ASL3.
E2 energises the drive magnet of uniselector AS.
C/1 relay releases after its delay time.
B/4 relay operates via C1 in normal position.
B1 operates relay D/2.
B2 operates relay C/1.
B3 releases relay E/2.
E/2 relay releases.
E2 de-energises the drive magnet $m^3$ of uniselector AS allowing it to step forward one contact.
E1 connects the positive main to the wiper of ASL3 via B4 thus energising coil of the drive magnet $m^1$ of uniselector TS.
D/2 relay operates via B1.
D2 energises beam locking magnet LM.
C/1 relay operates via B2.
C1 releases B/4 relay.
B/4 relay releases.
B4 disconnects positive via E1 and ASL3 from the drive magnet $m^1$ of uniselector TS allowing it to step forward one contact.
B1 releases relay D/2.
B2 releases relay C/1.
TSL1 energises the 10 lb. weight magnet $9^\times$.
TSL2 energises the 20 lb. weight magnet.
TSL3 energises the 30 lb. weight magnet.
TSL4 energises the 40 lb. weight magnet.
D/2' relay releases.
C/1 relay releases.
B/4' relay operates via C1 in normal position.
Sequence repeats as above to stepping of uniselector TS which moves on to the second contact.
TSL1 releases 10 lb. weight magnet $9^\times$.
TSL2 holds 20 lb. weight magnet.
TSL3 holds 30 lb. weight magnet.
TSL4 holds 40 lb. weight magnet.
D/2 relay releases.
C/1 relay releases.
B/4 relay operates via C1 in normal position.
Sequence repeats as above to stepping of uniselector TS which now moves on to the next contact.
TSL1 re-energises 10 lbs. weight.
TSL2 releases 20 lbs. weight.
TSL3 holds 30 lbs. weight.
TSL4 holds 40 lbs. weight.
D/2 relay releases.
C/1 relay releases.
B/4' relay re-operates via C1 in normal position.
Sequence as above. Uniselector TS steps on to the next contact.
TSL1 holds 10 lbs. weight.
TSL2 re-energises 20 lbs. weight.
TSL3 releases 30 lbs. weight.
TSL4 holds 40 lbs. weight.
D/2 relay releases.
C/1 relay releases.
B/4 relay re-operates via C1 in normal position.
Sequence as above. Uniselector TS steps on to next contact.
TSL1 holds 10 lbs. weight.

TSL2 holds 20 lbs. weight.
TSL3 re-energises 30 lbs. weight.
TSL4 releases 40 lbs. weight.
D/2 relay releases.
C/1 relay releases.
B/4 relay re-operates via C1 in normal position.
TS uniselector steps on to next contact.
TSL1 releases 10 lbs. weight.
TSL2 holds 20 lbs. weight.
TSL3 holds 30 lbs. weight.
TSL4 releases 40 lbs. weight.
D/2 relay releases.
D1 prepares the operating circuit for relay E/2.
D2 de-energises beam locking magnet LM and beam $1^\times$ now rises to the top stop $25^\times$ since the weight in the hopper $3^\times$ (654 lbs.) exceeds weight applied to beam (650 lbs.).
Contacts $14^\times$ close. Relay E/2 operates.
E1 breaks the operating circuit for uniselector TS via B4 and ASL3.
E2 energises the drive magnet $m^3$ of the uniselector AS.
C/1 relay releases after its delay period.
B/4 relay operates via C1 in normal position.
B1 operates relay D/2.
B2 operates relay C/1.
B3 releases relay E/2.
E/2 relay releases.
E2 de-energises the drive magnet $m^3$ of the uniselector AS allowing it to step on to the next contact.
E1 connects the positive main to the wiper of ASL3 via B4, thus energising the driving magnet $m^2$ of uniselector US.
D/1 relay operates via B1.
D2 energises LM.
C/1 relay operates via B2.
C1 releases relay B4.
B/4 relay releases.
B4 disconnects the positive main via E1 and ASL3 from the drive magnet $m^2$ of uniselector US, allowing the uniselector to step forward one contact.
USL1 energises 1 lb. weight magnet.
USL2 energises 2 lb. weight magnet.
USL3 energises 3 lb. weight magnet.
USL4 energises 4 lb. weight magnet.
D/2 relay releases.
C/1 relay releases.
B/4 relay operates via C1 in normal position.
Sequence as above. Uniselector US steps on to next contact.
USL1 releases 1 lb. weight.
USL2 holds 2 lb. weight.
USL3 holds 3 lb. weight.
USL4 holds 4 lb. weight.
D/2 relay releases.
C/1 relay releases.
B/4 relay re-operates via C1 in normal position.
USL1 holds 1 lb. weight.
USL2 re-energises 2 lb. weight magnet.
USL3 releases 3 lb. weight.
USL4 holds 4 lb. weight.
D/2 relay releases.
C/1 relay releases.
B/4 relay operates via C1 in normal position.
USL1 holds 1 lb. weight.
USL2 holds 2 lb. weight.
USL3 re-energises 3 lb. weight magnet.
USL4 releases 4 lb. weight.
D/2 relay releases.
C/1 relay releases.
B/4 relay operates via C1 in normal position.

USL1 releases 1 lb. weight.
USL2 holds 2 lb. weight.
USL3 holds 3 lb. weight.
USL4 releases 4 lb. weight.
D/2 relay releases.
C/1 relay releases.
B/4 relay operates via C1 in normal position.
USL1 re-energises 1 lb. weight magnet.
USL2 releases 2 lb. weight.
USL3 holds 3 lb. weight.
USL4 releases 4 lb. weight.
D/2 relay releases.
D1 prepares for the operation of relay E/2.
D2 de-energises the beam-locking magnet LM and the beam $1^\times$, now rises to the top stop $25^\times$ as the weight in the hopper $3^\times$ equals the weight applied to the beam.
Contacts $14^\times$ close. (It should be noted that the contacts $14^\times$ in practice would probably not close until a further weight had been removed from the weighbeam).
E/2 relay operates.
E1 breaks the operating circuit of the drive magnet $m^2$ of uniselector US via B4 and ASL3.
E2 energises the drive magnet $m^3$ of the uniselector AS.
C/1 relay releases after its delay time.
B/4 relay operates via C1 in normal position.
B1 operates relay D/2.
B2 operates relay C/1.
B3 releases relay E/2.
E/2 relay releases.
E2 de-energises the drive magnet $m^3$ of uniselector AS allowing the latter to step forward one contact.
ASL2 contact 4 is open circuit and thus relay B/4 is released and will not re-operate.
No further operations occur in the circuit until the "Cancel Reading" push button CR is operated to release relay A/3 when the uniselectors are homed via the normally closed contacts A3, A4, A5, A7.

Modifications in design or arrangement of the balancing weights or springs and of their controlling mechanisms may be made to suit individual requirements. The automatic control circuit may also be designed to suit the particular circumstances of the operation of the invention, as will be understood. For example, pneumatic or hydraulic servo systems for operating the balancing weights or springs may be adopted if desired.

A difficulty which is inherent in the accurate measurement of materials delivered from a hopper (cf. Fig. 2), is that there is always, at the instant when balance is actually achieved and the hopper outlet 17 closed by the shutter 19, a certain quantity of material in transit between the hopper outlet 17 and the scale pan. This "column in suspension" may, for a given apparatus, be of substantially constant dimensions, and a correction can, in these circumstances, be made by adjustment of the actual values, or of the points of application, of the various balance weights. In many cases, however, the weight of the "column in suspension" will be indeterminate and variable, and in these circumstances, adjustable resilient contact operating means may be associated with the free end of the weighbeam which would operate sufficiently in advance of the raising of this end to the balance position to ensure early partial closure of the slide 19 or like outlet control means.

One application of the present invention is to the loading of vehicles having differing tare weights with the same weights of material. In such an application, the vehicle is stood, empty, on a weighbridge connected to a weighbeam and the tare weight is first ascertained, either manually or automatically, in a manner set out above. When balance has been achieved, the additional predetermined weight of material to be loaded is added to the beam and discharge thereof into the vehicle is automatically controlled, as described above. Other applications of the invention will readily occur to those who are conversant with the art of weighing out quantities of materials or determining the value of unknown weights of material.

What I claim is:

1. Weighing mechanism comprising a weighbeam having a plurality of fixed stations spaced from the fulcrum thereof by predetermined distances for the application of balancing loads thereat, a plurality of known balancing loads arranged in groups, the members of each group being chosen so that, by selective application of any one or more of said loads in said group, any one of a set of balancing moments differing from another in the set by unity in a scale appropriate to the group may be applied to the beam, the scales of all the groups differing by a preselected ratio—for example, a ratio of ten, an electromagnetic device associated with each balancing load for applying and removing it to and from the beam as desired, a load uniselector switch associated with each group and having a plurality of contact banks, one for each load in the group, the contacts of a bank being arranged to energise the electromagnetic load applying devices so that progressive step-by-step operation of the said load uniselector causes progressive application of the loads in the group for exerting a balancing moment on the beam which varies in steps of unity on the scale appropriate to the group, a sequence control uniselector switch having a contact bank successive contacts of which are connected in circuit with the driving magnets of corresponding load uniselectors, an impulsing relay having a pair of make-and-break contacts connected in series with the wiper of the said control uniselector contact bank, relay means responsive to deflections of the beam for impulsing the control uniselector driving magnet, this relay means comprising a single slugged relay having a delayed release period at least as long as the period required for the load uniselector impulsing relay to perform a complete impulsing cycle, a pair of normally open contacts connected directly between the main power supply and the driving magnet of the sequence control uniselector, and a pair of normally closed contacts connected in series with the normally open load uniselector impulsing contacts of the said impulsing relay so as to suppress a load uniselector advancing impulse during advance of the control uniselector, a double slugged relay having a delayed release period greater than the period required for the beam to reach a stable condition after a change in applied balancing moment, a pair of normally open contacts controlled by the last-mentioned relay, a beam clamping electromagnet connected in circuit with the said slugged relay contacts, and a pair of normally open contacts operated by the load uniselector impulsing relay and connected in the double slugged relay circuit for energizing the said relay at each change of balancing moment.

2. Weighing mechanism according to claim 1 including a treble slugged relay having a delayed release period greater than the delayed release period of the double slugged relay and a pair of normally closed contacts in the circuit of the impulsing relay and controlled by said treble slugged relay to control the commencement of operation of the sequence control uniselector to apply successive increments of balancing moment to the weighbeam and to complete a "homing" circuit for restoring the uniselector to its zero position on completion of a weighing operation.

References Cited in the file of this patent

UNITED STATES PATENTS

| Number | Name | Date |
|---|---|---|
| 618,384 | Richards | Jan. 24, 1899 |
| 1,624,588 | Essmann | Apr. 12, 1927 |
| 1,661,556 | Bryce | Mar. 6, 1928 |
| 1,719,482 | Mills | July 2, 1929 |
| 2,066,762 | Bryce | Jan. 5, 1937 |
| 2,068,565 | Okey | Jan. 19, 1937 |
| 2,594,157 | Hadley | Apr. 22, 1952 |